Jan. 25, 1944.  E. GATEWOOD  2,339,922
FLUID LEVEL INDICATOR FOR PRESSURE BOILERS
Filed Aug. 25, 1943
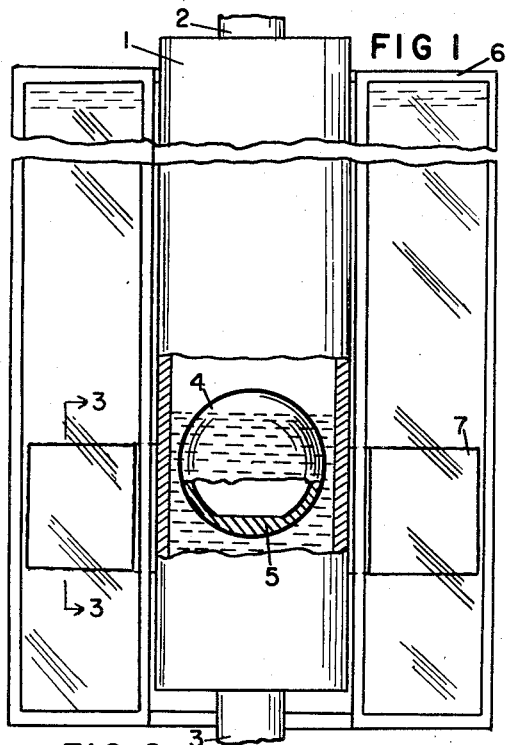
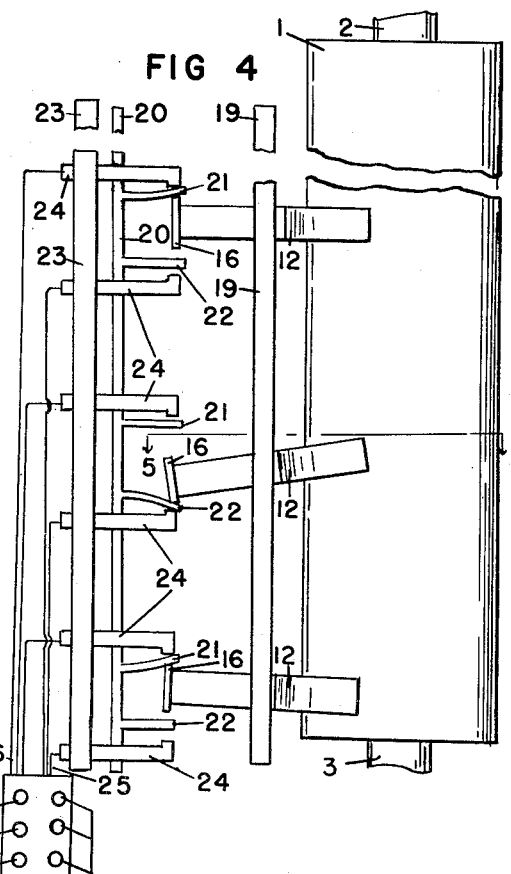
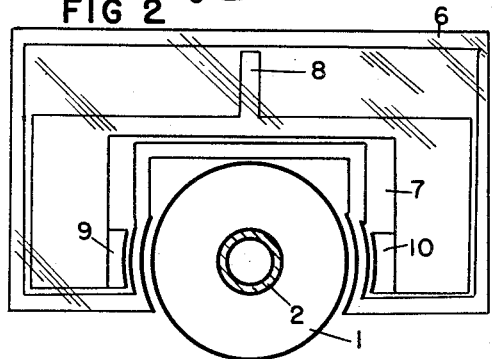
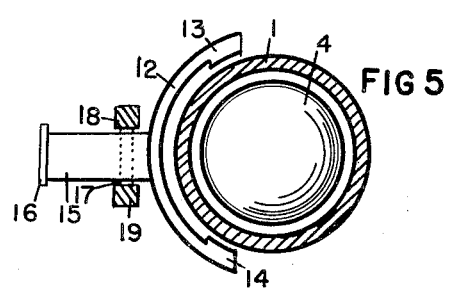
INVENTOR
Elbrige Gatewood Patented Jan. 25, 1944

2,339,922

UNITED STATES PATENT OFFICE 2,339,922

FLUID LEVEL INDICATOR FOR PRESSURE BOILERS

Elbrige Gatewood, New York, N. Y.

Application August 25, 1943, Serial No. 500,012

5 Claims. (Cl. 73—313)

My invention relates to simple and inexpensive and dependable means for indicating the water level in high pressure boilers, not having the disadvantage of water gauge glasses, which frequently break due to the high pressure and temperature.

Another object is to provide a dependable indicator at a distance from the boiler.

Another object is to provide a steel float which can be used under extremely high steam pressures without being crushed by the pressures.

Fig. 1 is a side view, partially cut away, of one form of this invention. Fig. 2 is a plan view of the same. Fig. 3 is a sectional view on the line 3—3 of Fig. 1. Fig. 4 is a side view of another form of indicator. Fig. 5 is a plan view in section along the line 5—5 of Fig. 4.

Referring to Fig. 1, 1 is a non-magnetic metal tube attached at 2 and 3 to a boiler in the position usual for a water gauge glass. A hollow ball 4 floats on the surface of the water. The lower part 5 of the ball may be made heavier. The ball 4 is made of magnetic material, at least for the lower part 5.

When used with extremely high boiler pressures, float 4 has a few drops of water or other fluid in the float 4. This water or other fluid will be wholly vaporized by the heat transmitted to it from the water and steam in the tube 1. When wholly vaporized, it will provide an internal pressure within the float sufficient to prevent collapse of the floating ball.

Since the water within the ball is entirely vaporized, a rupturing of the ball, which may occur if the external pressure is suddenly removed while the ball is still hot, will not produce any serious consequences. On the instant of rupture the entire pressure would be relieved by the escape of the small amount of steam or other gas within the ball.

A magnet 7 with two poles 9 and 10 and with hollow spaces 11 is freely suspended within a vessel of irregular shape 6 which partially surrounds tube 1. This vessel is made of glass or other transparent material, is filled with water, and sealed to prevent evaporation of the water. A few bubbles of air are left at the top of the water to compensate for stresses due to expansion or contraction of glass or water.

The magnet 7 is slightly heavier than the water it displaces, but is carried up and down by the mutual attraction between the magnet and the floating ball 4. The magnet is so shaped that it follows the inner walls of 6 without danger of becoming stuck. Fin 8 is a guide for that purpose.

Since the water in 6 is not under pressure and is only moderately warmed by the nearness of the hot tube 1, it will not break. If it does break at night when the boiler is not closely watched, as is frequently the case with apartment house boilers, no water escapes from the boiler.

It will be understood that I do not confine myself to this exact form. The vessel 6 can be omitted provided the permanent magnet 7 is sufficiently strong to be lifted without the aid of the buoyant effect of the water. Moreover indicating contacts may be included similar to those shown in Fig. 4, or of any other well known kind.

If the ball 4 becomes punctured and sinks, the permanent magnet will also sink indicating low water. In that case the attendant will make the routine check by means of test cocks that are always installed with gauge glasses to be used in case of failure of the gauge glass.

Figures 4 and 5 illustrate a variation which may be used when it is desired to provide an indicator of water level placed at a distance from the boiler. In this form several permanent magnets 12 are suspended rotatably on pins 17 based on stationary members 18 and 19. The weight of 12 is unequally distributed, causing the pole end of the magnet normally to descend as shown in the upper and lower magnets of Fig. 4. In this position the other end 16 of the magnet presses down on contact 21, causing it to touch upper contactor 24.

When float 4 is slightly above the magnet, it is drawn upward as shown in the middle magnet. This breaks the contact between 21 and 24 and makes a contact between 22 and 24.

Contactors 24 are immovably attached to stationary member 23, which is a non-conductor of electricity. The members 24 above the magnets are connected to electrical conductors 26 which run to one side of lamps 27. The members 24 below the magnets are connected to electrical conductors 25 which run to one side of lamps 28.

20 is a copper bus bar connected to the other side of the electrical circuit and having flexible members 21 and 22.

In the positions shown in Fig. 4, the upper and lower lefthand lamps 27 on panel 29 are lighted and the center lamp is not lighted. The center lamp 28 on the right hand of the panel is lighted while the upper and lower lamps are not lighted.

Magnets 12 will be placed sufficiently close together that one of the lamps 28 will at all times be lighted to indicate the level of the water.

The use of the two sets of lamps is a safety precaution. It gives warning if the electrical circuit becomes grounded causing a lamp to light up incorrectly.

It will be understood that the method of protecting a float against external pressure by putting a few drops of fluid within the float can be used with various water indicators now used, and this patent is intended to be broad enough to cover such uses.

I claim:

1. A fluid level indicator comprising a hollow tube made of non-magnetic material and connected at its two ends at the level at which water gauge glasses are ordinarily connected, a hollow vessel made of magnetic material and floating on the surface of the fluid in the hollow tube, a permanent magnet with two poles on opposite sides of the hollow tube in position to be attracted by and to attract the floating vessel and with hollow spaces within the magnet which give it a specific gravity slightly greater than the water it displaces, and a closed vessel filled with water and containing the permanent magnet, the vessel being of such shape as to permit the magnet to move freely up and down following the hollow vessel within the tube.

2. A fluid level indicator for high pressure boilers, comprising a hollow tube made of non-magnetic material and connected at its two ends to a boiler at the level at which water gauges are ordinarily connected, a hollow vessel made of magnetic material and floating on the surface of the fluid within the hollow tube, a sufficient amount of fluid, which may be water, within the floating vessel, that, when completely vaporized by the heat transferred from the steam and water within the hollow tube, the pressure of the vapor within the floating ball will be sufficient to preserve it against being crushed by external pressure, and a permanent magnet with two poles in position to attract and be attracted by the hollow float with sufficient force to cause the magnet to follow the float and thereby indicate the fluid level within the boiler.

3. In the type of fluid level indicator which makes use of a hollow floating vessel floating on the surface of water from a boiler and subjected to the pressure of the steam within the boiler, a hollow vessel containing within it a sufficient amount of fluid that, when entirely vaporized, will exert an internal pressure within the float sufficient to protect the float against the external pressure of the boiler steam.

4. A fluid level indicator comprising a hollow tube made of non-magnetic material and connected at its two ends at the level at which water gauge vessels are ordinarily connected, a hollow vessel made of magnetic material and floating on the surface of the fluid within the hollow tube, fluid within the hollow vessel which is converted into vapor by the heat of the fluid and vapor within the hollow tube at sufficient pressure to protect the hollow vessel against the external pressure, several permanent magnets located along the length of the hollow tube with their two permanent poles in position to attract and be attracted by the float, means rotatably supporting the permanent magnets on an axis with the weight of the magnets so distributed that one end will drop except when the mutual attraction of the magnets and the float lifts it, electrical contacts made and broken by the action of the magnets to light and extinguish lamps, and lamps at a position remote from the boiler and lighted and extinguished to indicate which magnet is so affected by the floating ball and thereby the level of fluid within the hollow tube.

5. A fluid level indicator for high pressure boilers comprising a hollow tube made of non-magnetic material and connected at its two ends to a boiler at the level at which water gauges are ordinarily connected, a hollow vessel made of magnetic material and floating on the surface of the fluid within the hollow tube and containing within it liquid sufficient that, when wholly vaporized by the heat of the fluid and vapor within the hollow tube, it will be protected against being crushed by the external pressure of the boiler pressure, and means operated by magnetic force indicating the position of the floating hollow vessel.

ELBRIGE GATEWOOD.